Sept. 5, 1933.    C. D. TUSKA    1,925,291
RADIO CIRCUIT RECEIVING SYSTEM
Filed Nov. 17, 1923
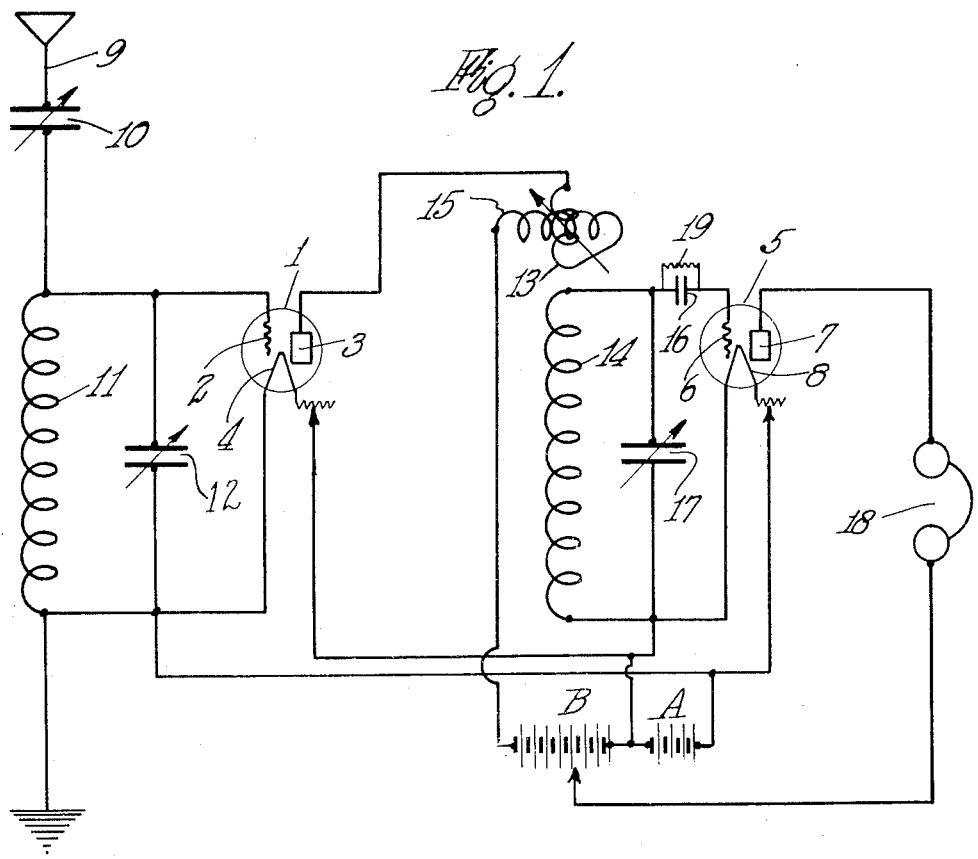
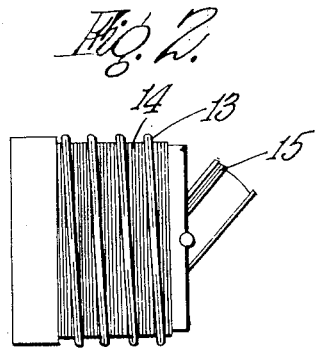
INVENTOR
Clarence D Tuska
BY Chapin & Neal
ATTORNEYS

UNITED STATES PATENT OFFICE 1,925,291

RADIO CIRCUIT RECEIVING SYSTEM

Clarence D. Tuska, Hartford, Conn., assignor, by mesne assignments, to Radio Corporation of America, a corporation of Delaware Application November 17, 1923
Serial No. 675,385

6 Claims. (Cl. 179—171)

This invention relates to circuit systems of radio apparatus and more particularly to a receiving system for amplifying and detecting radio frequency currents.

There is a well recognized difficulty in the employment of the three electrode vacuum tube or electron discharge tube for radio frequency amplification due to the tendency of the output or plate circuit of said tube to feed back energy to the input or grid circuit through the natural capacity coupling within the tube, which regeneration when carried far enough sets up spontaneous oscillations and interferes with the reception of signals. This feed back tendency is, of course, more pronounced at radio frequency, particularly when the output or plate circuit of the tube approaches resonance with a low resistance and tuned grid circuit. On the other hand tuned plate radio frequency amplification would be highly desirable in a radio receiving system if accomplished without oscillation and with low resistance circuits so as to result in improved selectivity together with increased signal strength.

One of the principal objects of the present invention, therefore, is to devise a suitable means for coupling together the output and input circuits of electron discharge tubes arranged in cascade, in a manner to prevent self-sustained oscillations. In the present embodiment I have shown the invention applied to an amplifying tube and a detector tube whereby the input circuit of each tube may be of low resistance and tuned to resonance with the incoming signal and whereby the output circuit of the amplifier may be kept sufficiently non-resonant to prevent spontaneous oscillations and at the same time may be coupled to the input circuit of the detector for the efficient transfer of energy thereto throughout a wide band of wave lengths.

A further object is the employment of low resistance circuits throughout said system for the attainment of greater selectivity as well as increased signal strength which together with a simplified manner of tuning control will greatly enhance the value of the system.

The salient and novel features of the invention will be set forth in the appended claims, and the construction and operation of the same will be understood by reference to the accompanying drawing, taken in connection with the following specification which discloses the preferred embodiment of the invention.

Referring to said drawing:

Fig. 1 shows an arrangement of circuits and connections illustrating the invention; and Fig. 2 is a detail view illustrating a preferred method of mounting the coupling coils.

In Fig. 1, 1 indicates the usual form of vacuum tube amplifier having a grid at 2, a plate at 3, and a heated filament at 4. 5 indicates a vacuum tube detector having a grid at 6, plate at 7, and heated filament at 8. A indicates the battery for heating the filamens 4 and 8. A indicates the battery for heating the filaments 4 and 8. B indicates the battery for the plate circuits of said tubes. The input or grid circuit of the amplifying tube 1 is adapted to be made resonant with the received oscillations, which may be impressed thereon from any suitable outside source, as for instance, an antenna circuit 9. The coupling of the grid circuit to said antenna circuit may be of any suitable form, here shown preferably as electrostatic through the condenser 10. Resonance for said grid circuit of the amplifier may be obtained by any suitable tuning means, in the present embodiment preferably consisting of a variable condenser 12 in parallel with the inductance coil 11. The plate circuit of the amplifier includes a relatively low inductance preferably in the form of a variometer as shown consisting of coils 13 and 15 each of comparatively few turns whereby the tuning effect of said variometer alone would be negligible except for its being coupled to the tuned input of the detector as hereinafter described.

The input or grid circuit of the detector 5 which includes the inductance coil 14 may be tuned to resonance in any suitable way as by the variable condenser 17 connected in parallel with said coil 14. 16 is the usual grid condenser with grid leak 19 in said grid circuit of the detector and 18 indicates the usual signal responsive device such as a telephone in the plate circuit of said detector. It should be understood that the output circuit of the detector, if desired, may transfer its energy to audio frequency amplifiers for further amplification in a manner well known in the art. It will also be understood that the coupling means described may be employed between successive amplifying tubes arranged in cascade in the same manner as between the amplifier and detector tubes here shown.

An important feature of the present invention resides in the manner of coupling the output circuit of the amplifier to the input circuit of the detector or next tube of the cascade arrangement so as to maintain said coupling uniformly effective throughout a wide band of wave lengths and also prevent oscillation. With this aim in view, I have employed an oscillation transformer for inductively coupling said circuits which is obtained by locating the coils 13 and 15 of the variometer in close coupled relation with the coil 14. In the practical embodiment of my invention, I have wound the fixed coil 13 tightly around the outside of coil 14 and mounted the movable coil 15 at the inside of said coil 14 and closely thereto as shown in Fig. 2. In practice, I have employed four turns in the fixed coil 13 and seven turns in the movable coil 15 as compared with thirty turns in the inductance coil 14 for present day broadcast reception.

The low inductance in said amplifier plate circuit due to the relatively small number of turns in said coils 13 and 15 renders said plate circuit essentially aperiodic with respect to any of the wave lengths within the range for which the input or grid circuits may be tuned, thus preventing regenerative feed back to the point of oscillation. The close coupling, however, between said coils 13, 15 and 14 desirable for the efficient transfer of energy will assist the tuned grid circuit of the detector in a tendency to force the aperiodic plate circuit into resonance. The tendency of a radio frequency vacuum tube circuit of the type described to oscillate increases as the frequency increases. To offset this tendency the inductance of the plate circuit may be decreased as the frequency increases. This decrease of inductance in the variometer simultaneously decreases the coupling so that the aperiodic plate circuit will receive correspondingly less forcing effect from the tuned grid circuit. This adjustable variation of the inductance and coupling is preferably accomplished in minute steps for which a variometer or similar device is particularly adapted. By such slight adjustments of the inductance in the plate circuit of the amplifier it may be held sufficiently non-resonant even against the forcing tendency of the tuned grid circuit of the detector to prevent spontaneous oscillation.

It will be observed further that in the circuit system described, resistance effects in the circuits are not employed for preventing oscillation while the circuits throughout are either wholly tuned or partially tuned whereby a high degree of selectivity will be attained. The simplicity of control will be apparent from the fact that but one adjustment is required for the amplifier input circuit, namely, condenser 12 and one adjustment for the detector input circuit, namely, condenser 17.

What I claim is:

1. A radio-frequency cascade amplified comprising a vacuum tube, an inductance in the plate circuit of said tube of such value as to maintain the plate circuit substantially aperiodic throughout the range of frequencies for which the amplifier is designed, a second vacuum tube, a tuned circuit inductively coupled to said inductance and connected in the grid circuit of the second tube, and means for varying both the coupling between the inductance and said tuned circuit and the value of the inductance, to control the transfer of energy between the circuits at different frequencies of the signal being amplified.

2. In a radio-frequency cascade amplifier having a pair of tubes coupled together by a step-up transformer, the primary of which is aperiodic throughout the range of frequencies for which the amplifier is designed and in the plate circuit of the first tube and the secondary of which is tuned and in the grid circuit of the second tube, that construction of the transformer in which only a part of the primary is mounted in variable inductive relation to the secondary.

3. In a radio-frequency cascade amplifier having a pair of tubes coupled together by a step-up transformer, the primary of which is aperiodic throughout the range of frequencies for which the amplifier is designed and in the plate circuit of the first tube and the secondary of which is tuned and in the grid circuit of the second tube, that construction of the transformer in which the primary is divided into two parts, one fixedly coupled to the secondary and the other in variable inductive relation both to the first part of the primary and to the secondary.

4. In a radio frequency cascade amplifier having a pair of tubes coupled together by a step-up transformer, the primary of which is aperiodic throughout the range of frequencies for which the amplifier is designed and in the plate circuit of the first tube and the secondary of which is tuned and in the grid circuit of the second tube, that construction of the transformer in which only a part of the primary is mounted in variable relation to the secondary, said secondary having more than four times as many turns as said variable primary part.

5. In a radio frequency cascade amplifier having a pair of tubes coupled together by a step-up transformer, the primary of which is aperiodic throughout the range of frequencies for which the amplifier is designed and in the plate circuit of the first tube and the secondary of which is tuned and in the grid circuit of the second tube, that construction of the transformer in which only a part of the primary is mounted in variable inductive relation to the secondary, said secondary having more than seven times as many turns as the first part of said primary.

6. In a radio frequency cascade amplifier having a pair of tubes coupled together by a step-up transformer, the primary of which is aperiodic throughout the range of frequencies for which the amplifier is designed and in the plate circuit of the first tube and the secondary of which is tuned and in the grid circuit of the second tube, that construction of the transformer in which the primary is divided into two parts, one fixedly coupled to the secondary and the other in variable inductive relation both to the first part of the primary and to the secondary, said secondary having more than twice as many turns as said primary.

CLARENCE D. TUSKA.